United States Patent [19]
Kinoshita

[11] Patent Number: 5,858,892
[45] Date of Patent: Jan. 12, 1999

[54] GLASS MATERIAL PRODUCING METHOD AND GEL DIPPING APPARATUS

[75] Inventor: Hiroaki Kinoshita, Hachiooji, Japan

[73] Assignee: Olympus Optical Co., LTD., Tokyo, Japan

[21] Appl. No.: 912,868

[22] Filed: Aug. 19, 1997

Related U.S. Application Data

[63] Continuation of Ser. No. 497,084, Jun. 30, 1995, abandoned.

[30] Foreign Application Priority Data

Jun. 30, 1994 [JP] Japan .................................... 6-173448
May 30, 1995 [JP] Japan .................................... 7-132017

[51] Int. Cl.$^6$ ................................ C03L 3/00; C03B 8/02
[52] U.S. Cl. ............................. 501/12; 65/17.2; 65/30.13
[58] Field of Search ............................... 501/12; 65/17.2, 65/30.13

[56] References Cited

U.S. PATENT DOCUMENTS

| | | | |
|---|---|---|---|
| 5,234,870 | 8/1993 | Osaka et la. ........................ | 501/103 X |
| 5,244,844 | 9/1993 | Inami et al. ............................... | 501/12 |
| 5,294,573 | 3/1994 | Haun ......................................... | 501/12 |
| 5,356,840 | 10/1994 | Noda ......................................... | 501/12 |
| 5,439,495 | 8/1995 | Koike et al. ........................... | 501/12 X |

*Primary Examiner*—Karl Group
*Attorney, Agent, or Firm*—Pillsbury Madison & Sutro LLP

[57] ABSTRACT

A method which enables an optical element having a large refractive index difference and a stabilized refractive index distribution to be produced in a short time. When a gel prepared by a sol-gel method is immersed in a solution containing at least one substance selected from the group consisting of an organic solvent, water, an acid, and an alkali, or in a solution having a metal salt dissolved in the at least one substance selected from the above group, a component eluted into the solution from the gel and/or a foreign substance which is produced or mixed in the solution during the solution immersing step is removed, and a component diffused into the gel from the solution is supplemented to the solution.

13 Claims, 9 Drawing Sheets

5,858,892

GLASS MATERIAL PRODUCING METHOD AND GEL DIPPING APPARATUS

This is a continuation of application No. 08/497,084, filed on Jun. 30, 1995, which was abandoned upon the filing hereof.

BACKGROUND OF THE INVENTION

1. Field of the Invention

The present invention relates to a method of producing a glass material which is applicable to optical elements of cameras, microscopes, etc. The present invention also relates to a gel immersing apparatus which may be suitably employed to carry out the glass material producing method.

2. Description of the Related Art

In the sol-gel method, a sol is prepared by reaction of a metal alkoxide of silicon, which forms the matrix of glass, with a solvent such as ethanol, a catalyst such as hydrochloric acid, etc. When an optical glass is to be produced, various metal components are added to the sol in order to vary the refractive index. Addition of the metal components is effected by adding to the sol alcohol solutions of metal alkoxides or derivatives thereof, or solutions of metal salts.

The use of a metal salt is particularly advantageous in that the raw material is inexpensive and capable of being handled in the air. However, a gel that is obtained by using a metal salt has the disadvantage that the water and solvent in the gel volatilize when the gel shrinks on drying., causing coarse crystals of the metal salt to precipitate and grow. Since the gel is broken by the growth of the crystals, it may be impossible to obtain glass of desired configuration. Accordingly, the conventional practice is to immerse the gel in a solution in which the solubility of the metal salt is low, thereby precipitating crystallites of the metal salt in the gel. Thereafter, sintering is carried out.

Meanwhile, Japanese Patent Application Post-Examination Publication No. 2-39454 discloses a method in which a gel is immersed in an organic compound, e.g. an alcohol, dioxane, acetone, etc., in order to prevent cracking of the gel.

Incidentally, there is a distributed index optical element in which a refractive index distribution is imparted to a medium so that the medium itself has refractive power (refractive index). Since the distributed index optical element has excellent aberration correcting capability, it enables a reduction in the number of constituent lens elements. Therefore, the distributed index optical element has attracted attention as an optical element which is essential for next generation optical systems.

As methods of producing such a distributed index optical element, the sol-gel method, the ion-exchange method, the molecular stuffing method, etc. are generally employed. Particularly, the sol-gel method has the advantageous features that it is possible to obtain a glass material having a large aperture, and that a distribution can be imparted to an oxide of a multivalent metal, and further that it is possible to vary the optical characteristics of the distributed index optical element obtained. Thus, the sol-gel method is an effective production method.

As conventional methods of preparing a distributed index optical element by the sol-gel process, there have been known a method which is reported in Elect. Lett. 22 (1986), p.1108, and a method which is disclosed in U.S. Pat. No. 4,686,195.

In the method that is reported in Elect. Lett. 22 (1986), p.1108, a wet columnar gel is prepared from silicon alkoxide and germanium alkoxide or titanium alkoxide. Then, the gel is immersed in water or a dilute aqueous solution of hydrochloric acid. Germanium or titanium, which is a component that gives a high refractive index, is partly eluted by the water or dilute aqueous solution of hydrochloric acid, whereas substantially no silicon is eluted. Accordingly, only the germanium or titanium component in the gel is eluted into the water or dilute aqueous solution of hydrochloric acid. By drying and sintering the gel, it is possible to prepare a distributed index optical element in which the refractive index decreases toward the outer peripheral portion from the center.

In the method of U.S. Pat. No. 4,686,195, a solution mainly containing silicon alkoxide and a metal salt is hydrolyzed to obtain a sol, and the sol is allowed to gel. The resulting gel is immersed in a solution in which the solubility of the metal salt is low, thereby precipitating crystallites of the metal salt in the gel. The gel is then immersed in a solution containing a metal salt different from the above metal salt. Consequently, the metal salt contained in the solution gradually diffuses from the surface toward the inside of the gel. In addition, the crystallites of the metal salt contained in the gel are gradually eluted from the surface of the gel to the outside. Then, the gel is dried and sintered, thereby making it possible to prepare a distributed index optical element in which the refractive index decreases toward the outer peripheral portion from the center.

The method that is disclosed in Japanese Patent Application Post-Examination Publication No. 2-39454, and the method that is described in U.S. Pat. No. 4,686,195, that is, a method in which a gel is immersed in a solution in which the solubility of a metal salt is low, thereby precipitating crystallites of the metal salt in the gel, suffer, however, from problems as stated below. When a gel immersing treatment is actually carried out in the above-described conventional process, some portions of the meniscus or other part of the gel are likely to chip off during the immersing in the solution and disperse in the solution. The gel may crack or break into pieces even more severely. In such a case, some broken pieces of the gel are smashed into fragments by stirring, and the fragments get mixed in the treating solution in such a state that colloidal particles are dispersed in the solution, resulting in an increase in the amount of elution of metal components and organic solvent, water, acid and other components into the solution from the broken pieces of the gel and the fragments thereof. The increase in the amount of elution causes a change in the equilibrium of the solution, resulting in a change of the metal component concentration in the unbroken gel. Particularly, as the number of gels which are treated simultaneously in a single container increases, the gels are more affected by the eluted substances and the fragments of the gel, thus producing a serious adverse effect on the yield. When such a gel is used to impart a refractive index distribution thereto, there may be a variation in the distribution profile because there is a variation in the metal concentration distribution in the gel.

Further, since the dispersed fragments of the gel act as a nucleating agent, coarse crystals of the metal salt are likely to form in some portions of the gel, causing the gel to break. The fragments of the gel may also cause crystallization on sintering, resulting in a white opaque bulk material being formed. Therefore, it has heretofore been difficult to obtain a crack-free transparent glass material.

There is a fixation and distribution imparting process in which a single gel is put in a single container to precipitate crystallites of a metal salt in the gel. This fixation and distribution imparting process requires a large number of steps and facilities, and it is therefore inefficient. Accordingly, it is essential from the industrial point of view to employ an efficient production method in which a plurality of gels are simultaneously put in a single container to carry out fixation and distribution imparting operations. In a method wherein a plurality of gels are simultaneously treated, if an extremely large amount of solution is used to treat the gels, for example, the above-described change in the concentration of the solution reduces. Therefore, the adverse effect on the yield will reduce. However, this method causes an increase in the amount of solution used and also an increase in size of the system, and hence unfavorably requires a wider space and a great deal of cost. Accordingly, it has been demanded to establish a glass producing method which requires a small amount of solution for treatment, and which enables a plurality of gels to be simultaneously and readily treated in a short time by using a small-sized system. More particularly, it has been demanded to establish a glass producing method which enables a glass material stabilized in quality, e.g. refractive index, to be readily obtained in a short time at a reduced cost.

In a case where a distributed index optical element is used in a lens system of a camera or the like, the refractive index distribution profile is important. The following expression shows the relationship between the refractive index and the distance from the center of a distributed index optical element:

$$N(r)=N_0+N_1r^2+N_2r^4+N_3r^6+\ldots$$

where $N(r)$ is the refractive index at a point defined by a radius r from the center, $N_0$ is the refractive index at the center, and $N_1$, $N_2$, $N_3$... are distribution coefficients.

Matters of great concern in terms of the distribution profile are the refractive index difference $\Delta n$ between the central and peripheral portions, and the distribution coefficient at the lens peripheral portion for correcting aberrations. The power of a distributed index optical element is determined by the value of $N_1$. Therefore, as the absolute value of $N_1$ increases, that is, as $\Delta n$ increases, the effect of the distributed index optical element becomes more powerful. For the aberration correction at the lens peripheral portion, the distribution coefficients $N_2$, $N_3$. . ., which have a great effect on the distribution profile at the peripheral portion are important factors. It is generally known that a glass material which has a large refractive index difference and a parabolic refractive index distribution profile is useful from the viewpoint of aberration correcting capability and the readiness of lens design. Therefore, it has heretofore been considered necessary to establish a method of producing such a glass material.

However, neither of the methods disclosed in Elect. Lett. 22 (1986), p.1108 and U.S. Pat. No. 4,686,195 can produce the desired glass material. That is, the glass material produced by either of the conventional methods has an unfavorably small refractive index difference and a non-parabolic refractive index distribution profile, that is, a distribution profile in which the refractive index distribution curve is undesirably inflected at the lens peripheral portion. FIG. 10 is a conceptual view showing the refractive index distribution. In the figure, the dotted line shows a parabolic distribution profile, and the solid line shows a distribution profile obtained by the above-described prior art. When a lens system is prepared by using a glass material having such a non-parabolic distribution profile, since the value of $\Delta n$ is small, the power of the medium itself is weak, and since the distribution curve has a point of inflection at the lens peripheral portion, light rays cannot effectively be converged. Accordingly, aberration correcting effect which is unique to the distributed index optical element cannot satisfactorily be obtained. If the glass peripheral portion is cut off so as to avoid the point of inflection at the peripheral portion, the effective aperture of the lens is undesirably limited.

The mechanism of the occurrence of a disorder in the distribution profile, which is a problem associated with the prior art, will be explained below by way of an example shown in U.S. Pat. No. 4,686,195. In the example, attempts were made to control the metal concentration distribution profile, that is, the refractive index distribution, by changing the time for which a gel containing lead acetate was immersed in a distribution imparting solution, to thereby control the amount of elution of lead acetate.

FIG. 11 shows the time for which the gel was immersed in the distribution imparting solution and the profile of the metal concentration in the gel. The gel was immersed in the distribution imparting solution for three different periods of time: 4 hours (characteristic curve a); 16 hours (characteristics curve b); and 24 hours (characteristic curve c). It will be understood from FIG. 11 that, as the immersing time becomes longer, the metal concentration at the gel peripheral portion increases, and the parabolic distribution profile is gradually deformed. As a result, it becomes impossible to obtain a gel having the desired parabolic lead concentration distribution. FIG. 12 shows the refractive index distributions of glass materials obtained by sintering the gels prepared as described above. In the figure, the characteristic curve a shows the refractive index distribution of a glass material produced from a gel immersed for 4 hours in the same way as in FIG. 11. The characteristic curve b shows the refractive index distribution of a glass material produced from a gel immersed for 16 hours. The characteristic curve c shows the refractive index distribution of a glass material produced from a gel immersed for 24 hours. As will be understood from FIG. 12, the parabolic distribution profile is deformed, resulting in a glass material having a refractive index distribution profile in which the distribution curve is undesirably inflected at the outer peripheral portion, as shown in the conceptual view of FIG. 10.

The above-described phenomenon may be explained as follows: It may be considered that, when a columnar gel containing a salt of metal species A is immersed in a distribution imparting solution containing a salt of metal species B, the formation of a radial concentration distribution of each of the metal species A and B during the distribution imparting process takes place according to the diffusion rule. More specifically, metal ions A diffuse into the distribution imparting solution having a relatively low concentration of metal species A from the gel having a relatively high concentration of metal species A. Conversely, the metal species B in the distribution imparting solution diffuse into the gel having a low concentration of metal species B from the solution having a relatively high concentration of metal species B. The reaction taking place at that time may be considered to be an ion-exchange reaction, and upon completion of the distribution impartation, the concentration gradients of metal species A and B from the central portion of the gel toward the peripheral portion thereof must have no point of inflection.

In actual practice, however, the metal species A in the gel are eluted into the distribution imparting solution. Therefore, the A concentration in the dipping solution increases, and thus the difference in the A concentration between the gel and the distribution imparting solution decreases. As a result, the dissolution equilibrium changes. Accordingly, the rate of dissolution of the metal species in the distribution imparting solution gradually reduces. The degree of reduction in the dissolution rate differs depending on the kind of metal species eluted from the gel and the kind of solution. In many cases, however, the dissolution rate reduces as shown in FIG. 13. That is, when a certain amount of metal species A has been eluted into the solution, the rate of dissolution reduces. As the rate of dissolution reduces, the elution of the metal species A from the gel becomes slow, and the time required for the metal species A to be eluted increases, resulting in a metal concentration distribution in which the rate of elution of the metal species A from the gel into the solution gradually reduces. That is, no parabolic distribution profile such as that shown by the dotted line in FIG. 10 can be obtained, and the resulting distribution profile has a point of inflection such that the distribution curve becomes undesirably gentle at the outer peripheral portion of the gel, as shown by the solid line in the figure.

Further, as the dipping time lengthens, the metal species B in the solution diffuse into pores of the gel. Consequently, the concentration of the metal species B in the solution gradually reduces. In other words, since the rate of diffusion of the metal species B to be supplied into the gel decreases, no ideal diffusion takes place, and thus the distribution profile is deformed.

Thus, since the distribution imparting conditions are greatly affected by the presence of metal ions eluted into the distribution imparting solution from the gel and metal ions diffused into the gel from the solution, a long time is required for the distribution impartation, and it is impossible to obtain a distributed index optical element having a parabolic distribution profile and a large refractive index difference.

Although in the forgoing the fixation of crystallites, the distribution impartation, etc., which are related to the chemical equilibrium of a solution have been described, it should be noted that an adverse effect is also produced when dust or the like, which is not related to the chemical equilibrium, is attached to the gel. For example, when dust is attached to the gel in the distribution imparting process, the way in which the distribution imparting solution contacts the gel changes. Therefore, it becomes impossible to impart a uniform distribution. Thus, the distribution is disordered.

Further, since foreign substances such as fragments of the gel act as a nucleating agent and cause crystallization, as described above, the resulting glass material may become opaque. For example, metal components such as Ti, Ba, Sn, Zr, Cu, and Nb in particular are likely to act as a nucleating agent, and when attached to the gel, these metal components cause crystallization and devitrification during sintering process.

Thus, with the prior art, the amount of fixation of a metal component to a gel and the amount of elution of a metal component from the gel are affected by the solubility in the solution, that is, the amount and composition of the solution (the kinds of metal, solvent and acid contained in the solution, and the concentrations thereof) and the existence of dust or other impurities. Unless these components and impurities are removed and the relationship between the gel and the dipping solution is kept constant at all times, the amount of metal component fixed in the gel varies, and the distribution rate changes, resulting in variation of the refractive index distribution profile. Consequently, it is impossible to obtain a glass material having a large refractive index difference and a parabolic distribution profile. Moreover, it is impossible to obtain an optical element stabilized in quality.

SUMMARY OF THE INVENTION

In view of the above-described problems of the prior art, an object of the present invention is to provide a glass material producing method which enables a glass material stabilized in quality, e.g. refractive index, to be readily obtained in a short time.

Another object of the present invention is to provide a glass material producing method which enables a distributed index optical element having a large refractive index difference and stabilized in quality, e.g. refractive index distribution, to be readily obtained in a short time.

Still another object of the present invention is to provide a gel immersing apparatus which may be suitably employed to carry out the above-described glass material producing method.

To attain the above-described objects, the present invention provides a glass material producing method having the step of immersing a gel prepared by a sol-gel method in a solution containing at least one substance selected from the group consisting of an organic solvent, water, an acid, and an alkali, or in a solution having a metal salt dissolved in the at least one substance selected from the above group. The method is characterized by removing a component eluted into the solution from the gel, and/or a foreign substance which is produced or mixed in the solution during the solution immersing step.

In the present invention, the component eluted into the solution from the gel may be removed by a trapping member.

In such a case, the trapping member may comprise at least one selected from the group consisting of an ion-exchange resin material, a chelate resin material, a porous material, an electrically charged membrane, a clathrate compound, and an organic polymer filter.

Further, in the present invention, the component eluted into the solution from the gel may be separated from the solution by precipitation.

In the present invention, the component eluted into the solution from the gel may be separated from the solution by distillation.

In addition, the present invention provides a glass material producing method having the step of immersing a gel prepared by a sol-gel method in a solution containing at least one substance selected from the group consisting of an organic solvent, water, an acid, and an alkali, or in a solution having a metal salt dissolved in the at least one substance selected from the above group. The method is characterized by supplementing a component diffused into the gel from the solution to the solution.

In addition, the present invention provides a glass material producing method having the step of immersing a gel prepared by a sol-gel method in a solution containing at least one selected from the group consisting of an organic solvent, water, an acid, and an alkali, or in a solution having a metal salt dissolved in the at least one substance selected from the above group. The method is characterized by removing a component eluted into the solution from the gel, and/or a foreign substance which is produced or mixed in the solution during the solution immersing step, and supplementing a component diffused into the gel from the solution to the solution.

In any of the above-described arrangements, a concentration gradient of a metal component may be imparted to the gel by immersing the gel in the solution.

In addition, the present invention provides a gel immersing apparatus which is employed in a glass material producing process in which a gel prepared by a sol-gel method is immersed in a solution containing at least one substance selected from the group consisting of an organic solvent, water, an acid, and an alkali, or in a solution having a metal salt dissolved in the at least one substance selected from the above group. The apparatus includes: a part for removing a component eluted into the solution from the gel, and/or a foreign substance which is produced or mixed in the solution during the immersing of the gel in the solution; and/or a device for supplementing a component diffused into the gel from the solution to the solution.

The gel immersing apparatus of the present invention has as essential constituent features: a tank for containing a solution for immersing a gel prepared by a sol-gel method, the solution containing at least one substance selected from the group consisting of an organic solvent, water, an acid, and an alkali, or the solution having a metal salt dissolved in the at least one substance selected from the group, the metal salt being intended to diffuse into the gel; and a device for stirring the solution. The gel immersing apparatus of the present invention may be arranged in various forms by properly combining the above-described constituent features with the following devices (A), (B), (C) and (D):

(A) a filter device for removing foreign substances such as gel fragments, dust, etc. from the solution;

(B) a device for removing unnecessary metal ions from the solution;

(C) a device for removing a solution component eluted into the solution from the gel; and (D) a device for supplementing the metal salt diffused into the gel.

The gel immersing apparatus of the present invention may further have a solution circulating path which extends from the tank and returns thereto via the means (A), (B), (C) or (D).

BRIEF DESCRIPTION OF THE DRAWINGS

Other objects and advantages of the present invention will become apparent during the following discussion in conjunction with the accompanying drawings, in which.

DETAILED DESCRIPTION OF THE INVENTION

The function of the present invention will be explained below by way of an example in which a homogeneous glass is prepared by carrying out a process of precipitating crystallites of a metal salt in a gel containing the metal salt. In the first-described method of the present invention, when a gel containing a metal salt is immersed in a metal salt fixing solution, metal ions and a solvent are eluted from the gel. Further, when the solution is stirred or the gel is moved, gel fragments and dust are likely to disperse into the fixing solution. Therefore, such metal ions and solvent, together with gel fragments and dust, are removed by using a filter or an ion-exchange resin material, thereby stabilizing the quality of the gel thus obtained.

Figure 1:
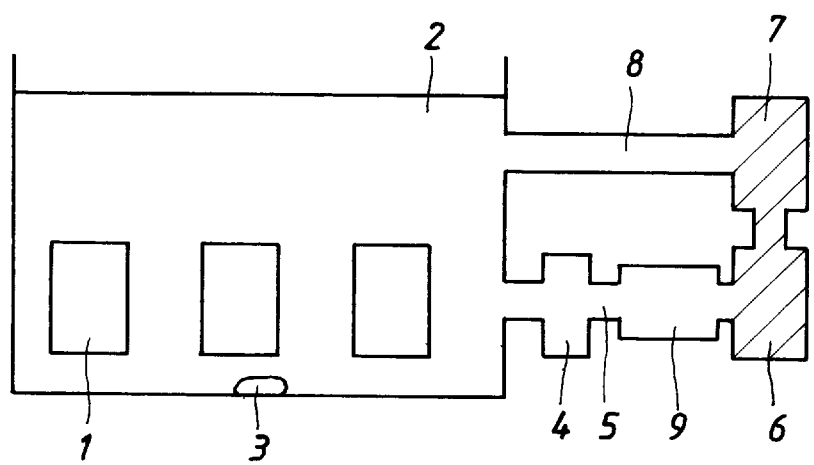
FIG. 1 schematically shows the arrangement of an immersing apparatus employed in the present invention.

More specifically, a columnar gel which is obtained from a sol containing a metal salt A, silicon alkoxide and a solvent B is immersed in a metal salt fixing solution having an appropriate solubility by using an immersing apparatus such as that shown in FIG. 1, thereby precipitating crystallites of the metal salt A in the gel 1. A very small amount of metal salt A in the gel 1 dissolves in the metal salt fixing solution 2, but almost all the metal salt A precipitates because the solubility gradually lowers owing to the solvent exchange between the solution component B in the gel 1 and the metal salt fixing solution 2. As a result, crystallites of the metal salt are fixed to the gel skeleton. The metal salt fixing solution 2 containing metal ions A is constantly stirred by a stirrer 3. The solution 2 is passed through a pipe 5 by the action of a pump 4, and after passing through a flat membrane 9 constituting a filter tank, the metal salt fixing solution 2 passes through ion-exchange resin materials 6 and 7. In this example, the flat membrane 9 is formed by using an organic polymer, e.g. Teflon. As the ion- exchange resin material 6, a polymer having an anion group, e.g. sulfonic group, is used. As the ion-exchange resin material 7, an ion-exchange resin polymer having an octadecyl group or other similar group is used.

Figure 15:
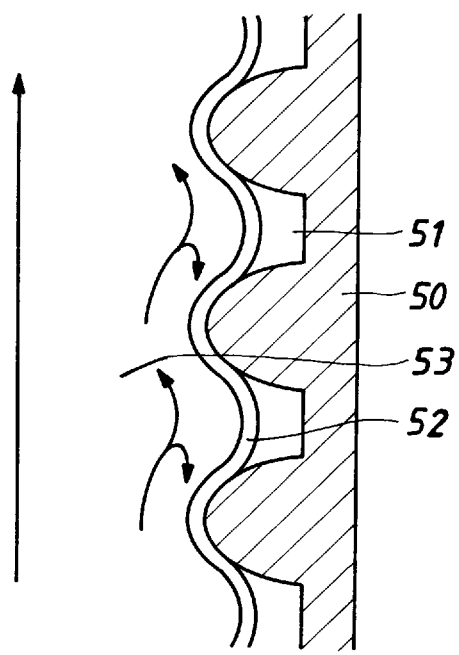
FIG. 15 is a fragmentary sectional view schematically showing a flat membrane.

FIG. 15 is a sectional enlarged view of a flat membrane filter. When a solution 53 containing foreign substances is made to flow in parallel to the membrane surface (i.e. crossflow), foreign particles of various sizes are deposited depending upon the flow velocity of the solution and therefore capable of being removed. The rate of deposition of foreign substances is determined by the flow velocity of the solution. The flat membrane 9 has holes with a size of from several micrometers to several millimeters, and thus separates gel fragments and dust particles, which have a particle size larger than the size of the holes.

Subsequently, the metal species A, which are cations, contained in the solution 2 are adsorbed by the polymer 6 having an anion group, and the solvent B eluted from the gel 1 is adsorbed and thus trapped by the ion-exchange resin polymer 7. Accordingly, the solution 2 which has passed through the ion-exchange resin materials 6 and 7 does not contain the metal species and solvent B eluted from the gel 1. The solution 2 is returned to the tank through a pipe 8. Thus, the metal salt fixing solution 2 is constantly supplied with a solution containing no metal species A nor solvent B. Accordingly, even when the gel 1 breaks, it is possible to ignore a component which dissolves in the solution 2 from the gel 1. That is, the dissolution equilibrium of the metal species A can be kept constant at all times, and the elution of the metal species A can be held constant at all times independently of the dipping time and the increase in the surface area of the gel 1 due to breakage. Therefore, it is possible to obtain a gel with high reproducibility. By drying and sintering the gel, an optical element having stabilized quality can be produced in a short time.

When the gel is gradually broken into a large number of fragments, if the fragments are removed with a pair of tweezers, the volume ratio of the gel to the solution cannot be held constant. In such a case, so to make the volume ratio of the gel to the solution constant, the gel immersing solution may be removed by an amount corresponding to the number of gel fragments removed. Therefore, the quality of the resulting optical element is stabilized even more favorably.

Thus, the method of the present invention can be advantageously applied to an efficient process in which a plurality of gels are simultaneously subjected to a fixing operation in a single container. That is, the present invention enables the solution composition, i.e., the metal salt concentration and the solvent ratio in the solution used to immerse the gels, to be held constant, and hence makes it possible to eliminate the influence of components eluted into the immersing solution from the gels even if the gels crack or break. Accordingly, the quality of optical elements obtained can be held constant. Further, a plurality of gels can be simultaneously subjected to fixation in a single container.

Further, since the condition of the solution in which the gel is immersed is kept constant at all times and hence the same treatment can be carried out many times, it is possible not only to save the raw materials used but also to reduce the amount of waste fluid to be treated. Accordingly, the method of the present invention is favorable from the viewpoint of global environmental protection and the conservation of resources.

If the present invention is applied to a method of producing a distributed index optical element, particularly advantageous effects are produced as described below. The present invention may be applied to a process of imparting a distribution to a gel in the following variety of forms:

(1) Removal of a metal component eluted from the gel by trapping;
(2) Removal of a metal component eluted from the gel by precipitation;
(3) Removal of a solution component eluted from the gel;
(4) Supplementation of a component reduced in amount due to diffusion into the gel;
(5) Removal of relatively large foreign substances such as large fragments of the gel and dust particles; and so forth.

The function of the present invention will be explained below by way of an example for each of the above-described cases.

Figure 2:
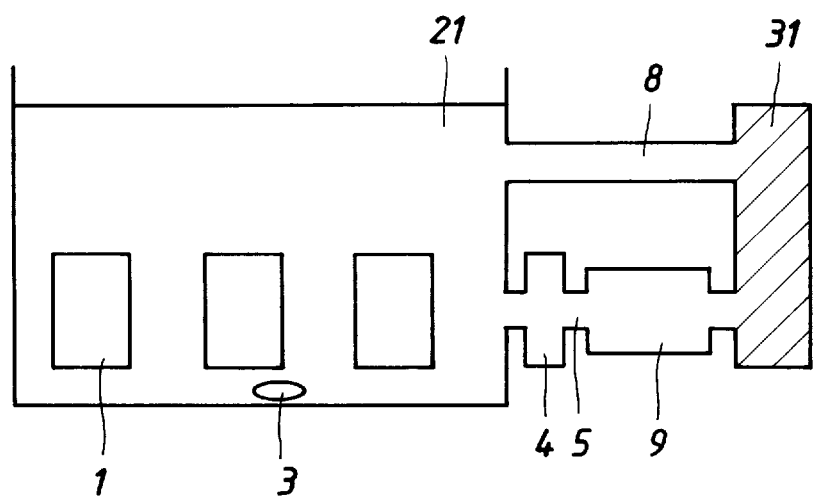
FIG. 2 schematically shows the arrangement of an immersing apparatus employed in the present invention.

In the case of (1), that is, in a case where a distribution imparting solution is stabilized by trapping metal species:

For example, a columnar gel is obtained from a sol containing metal species A which are divalent ions, which contribute largely to the refractive index, and silicon alkoxide. The gel is immersed in an appropriate solution to precipitate crystallites of the metal species A in the gel 1. Next, by using an immersing apparatus as shown in FIG. 2, the gel 1 is immersed in a distribution imparting solution 21 containing metal species B which are monovalent ions, which contribute slightly to the refractive index. The metal species A in the gel 1 are gradually dissolved in the distribution imparting solution 21, so that the concentration of the metal species A in the distribution imparting solution 21 gradually rises. On the other hand, the metal species B in the distribution imparting solution 21 gradually diffuse into the gel 1, so that the concentration of metal species B in the distribution imparting solution 21 gradually lowers. The distribution imparting solution 21 containing the metal ions $A^{2+}$ and $B^+$ is constantly stirred by a stirrer 3. The solution 21 is passed through a pipe 5 by the action of a pump 4, and after passing through a flat membrane 9, the solution 21 passes through an ion-exchange resin material 31.

As the ion-exchange resin material 31, a polymer having an anion group is used. The metal species A, which are divalent cations, are selectively and very strongly adsorbed on the polymer having an anion group. However, the metal species B, which are monovalent cations, are only slightly adsorbed on the polymer. Accordingly, the distribution imparting solution 21 which has passed through the ion-exchange resin material 31 contains no metal species A but the metal species B only. The solution 21 is returned to the tank through a pipe 8 so as to serve as the distribution imparting solution 21 again.

Thus, the distribution imparting solution 21 is constantly supplied with a solution containing no metal species A. Accordingly, the metal salt concentration is kept constant independently of the gel immersing time. Since the dissolution equilibrium of the metal species A is held constant at all times and the rate of elution of the metal species A is kept constant at all times independently of the immersing time, the metal species A is eluted from the gel at a constant rate. Further, since the metal species A are removed from the solution 21, the concentration of the metal species A in the gel is always higher than in the solution 21. Accordingly, it is possible to obtain a parabolic metal concentration distribution according to the diffusion rule. That is, it is possible to obtain an ideal metal concentration distribution of the metal species A, which contribute largely to the refractive index. Therefore, by sintering the gel, it is possible to stably obtain a distributed index optical element having a parabolic distribution profile and a large refractive index difference.

Figure 3:
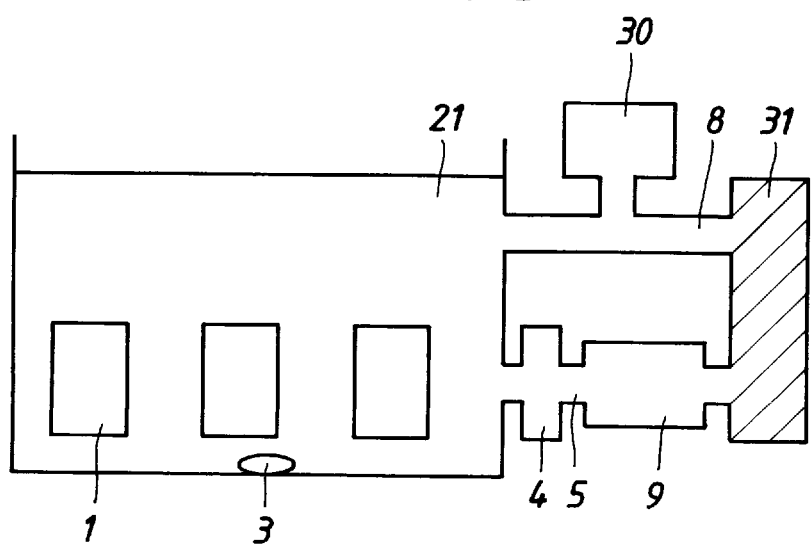
FIG. 3 schematically shows the arrangement of an immersing apparatus employed in the present invention.
Figure 4:
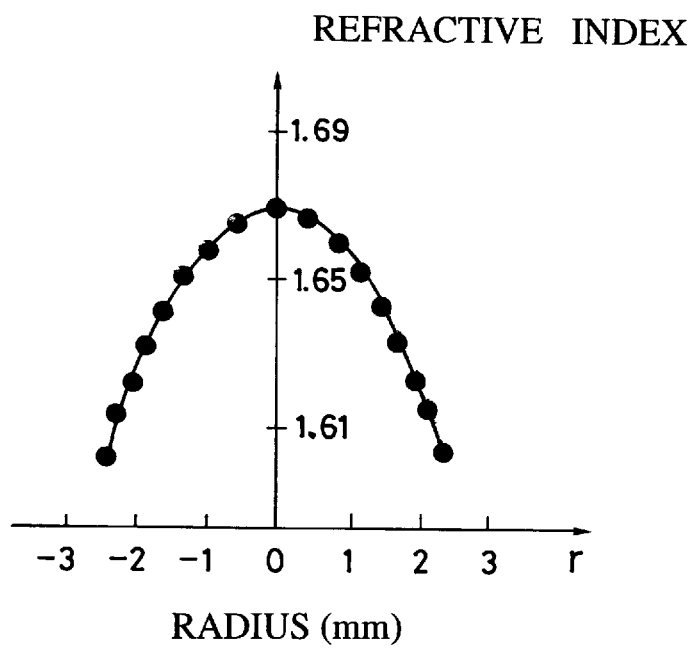
FIG. 4 is a graph showing the index distribution of a distributed index optical element in Example 3.

It is preferable for the ion-exchange resin material used in the above-described process to selectively adsorb only the ions of the desired metal species A, as has been described above. In a case where the ion-exchange resin material also adsorbs the ions of the metal species B, a predetermined amount of metal species B may be added from a metal species adding part 30, as shown in FIG. 3, which is provided in the intermediate portion of the pipe 8.

Although in the foregoing description an ion-exchange resin material is used as one example of a member for trapping metal species, it is also possible to use a chelate resin material which forms a chelate with metal species and thus adsorbs metal ions in an insoluble polymer phase, a porous material having pores for physically adsorbing metal species, an electrically charged membrane which electrically separates metal species, or a clathrate compound which inactivates metal species by reacting with them. These materials may be used alone. However, if a plurality of such materials are used in combination, the effect is enhanced.

As the above-described ion-exchange resin material, an appropriate material may be selected according to the valency and electronegativity of metal species contained in the gel or the distribution imparting solution. However, it is particularly preferable to use polymers having such groups as a sulfonic acid group, a carboxylic acid group, a phosphoric acid group, a phenolic hydroxyl group, or a perfluorotertiary alcohol because these polymers have an electric charge of appropriate magnitude and a suitable physical structure. Table 1 below shows selectivity coefficients (a measure of ion-exchange adsorbability; the larger the numerical value, the higher the adsorbability) for a polystyrol sulfonic acid type cation-exchange resin material (X number: 4; which indicates a crosslinking degree of 4%) which is commercially available from Dow Chemical co. as one example of ion-exchange resin materials. In general, polyvalent ions have larger selectivity coefficients than those of monovalent ions; polyvalent ions are preferentially adsorbed. Therefore, metal species can be selectively separated.

TABLE 1

| Cationic species | Crystal ion radius (Å) | Selectivity coefficient $K_{Na}^{M}$ |
|---|---|---|
| $Li^{+}$ | 0.60 | 0.63 |
| $H^{+}$ | | 0.84 |
| $Na^{+}$ | 0.95 | 1.00 |
| $NH_4^{+}$ | | 1.20 |
| $K^{+}$ | 1.33 | 1.44 |
| $Rb^{+}$ | 1.48 | 1.56 |
| $Cs^{+}$ | 1.69 | 1.69 |
| $Mg^{2+}$ | 0.65 | 1.87 |
| $Zn^{2+}$ | 0.74 | 1.98 |
| $Co^{2+}$ | | 2.04 |
| $Cu^{2+}$ | | 2.08 |
| $Cd^{2+}$ | 0.97 | 2.13 |
| $Ni^{2+}$ | | 2.18 |
| $Ca^{2+}$ | 0.99 | 2.63 |
| $Sr^{2+}$ | 1.13 | 2.97 |
| $Ba^{2+}$ | 1.35 | 4.73 |

As the above-described chelate resin material, an appropriate material may be selected according to the valency and electronegativity of metal species contained in the gel or the distribution imparting solution. However, it is particularly preferable to use polymers having such groups as an iminodiacetic acid group, an iminopropionic acid group, an aminophosphoric acid group, or a phosphoric acid group because these polymers have an electric charge of appropriate magnitude and a suitable physical structure.

As the porous material, an appropriate material may be selected according to the valency, electronegativity and ion radius of metal species contained in the gel or the distribution imparting solution. However, it is particularly preferable to use silicate clay minerals, e.g. zeolite, kaolin, silica gel, etc., anhydrous salts of sodium aluminate, sodium borate, etc., alumina, porous glass, etc. in the form of powder or molded piece, from the viewpoint of the diversity of pore diameter and the stability to an organic solvent and acid.

As the electrically charged membrane, an appropriate material may be selected according to the valency and electronegativity of metal species contained in the gel of the distribution imparting solution. However, it is particularly preferable to use a bipolar ion-exchange membrane having a structure in which an anion-exchange region and a cation-exchange region extend through the membrane from one side to the other thereof, from the viewpoint of the excellence in permeability to metal ions, i.e. electrolyte.

As the clathrate compound, an appropriate compound may be selected according to the valency, electronegativity and ion radius of metal species contained in the gel or the distribution imparting solution. However, it is particularly preferable to use a polymer of cyclodextrin, crown ether and kalixarene for the reason that it has an appropriate pore diameter.

In the case of the above (2), that is, in a case where the distribution imparting solution is stabilized by precipitating the metal species A:

For the above-described purpose, the following various methods are available: a method in which an organic or inorganic acid or a salt thereof is added to the distribution imparting solution to precipitate either of the metal species A and B by making use of the difference in reactivity to the reagent between the metal species A and B, thereby separating them from each other; a method in which an electrically conductive member having positive or negative charge is brought into contact with the solution to electrolytically depositing either of the metal species A and B by making use of the difference in electric charge between them, thereby separating the metal species A and B from each other; a method in which the solution is cooled to precipitate either of the metal species A and B by making use of the difference in the change of solubility with temperature between the metal species A and B, thereby separating them from each other; and so forth.

As the above-described organic or inorganic acid or salt thereof, an appropriate acid or salt may be selected according to the valency and solubility of metal species contained in the gel or the distribution imparting solution and the dielectric constant of the solvent. However, it is particularly preferable to use an acid or a salt which has such groups as a sulfonic acid group, a chloric acid group, a hydrofluoric acid group, or a phosphoric acid group from the viewpoint of the magnitude of pH and solubility.

In the foregoing, methods of removing a metal component eluted into the solution from the gel have been described. It is most preferable to remove the eluted metal component completely. However, it is not always necessary to completely remove the metal component. It will suffice to remove the eluted metal component to such an extent that the desired distribution profile can be obtained. For example, if the concentration of the metal species A is low, there is no very serious influence on the solubility. Therefore, elution of the metal species A can be ignored.

Although in the foregoing the function of the present invention has been explained with regard to a convex distribution in which the refractive index distribution of glass decreases toward the outer peripheral portion from the center, it should be noted that the present invention is also effective for a concave distribution in which the refractive index distribution increases toward the outer peripheral portion from the center, as a matter of course. Further, it is particularly preferable that the present invention should be carried out with respect to elements which contribute largely to the refractive index and dispersion, such as barium, lead, rare earth elements, etc.

In the case of the above (3), that is, in a case where a solution component eluted into the solution from the gel is removed:

In general, a gel is obtained by gelation of a sol which is hydrolytically prepared by adding water and an acid or a base to a mixture of a metal alkoxide and an organic solvent. When the gel is immersed in a distribution imparting solution such as an organic solvent, water, an acid, etc., solvent exchange takes place between the solvent in the gel and the solvent in the distribution imparting solution. Accordingly, when the solvent in the gel and the solvent in the distribution imparting solution are different in kind or quantity from each other, the composition of the distribution imparting solution changes. Consequently, the solubility of the metal salt in the distribution imparting solution changes; this may cause the distribution imparting rate or the distribution fixing profile to change. Therefore, if it is possible to remove a solution component (an organic solvent, water, an acid, etc.) eluted into the distribution imparting solution from the gel, the distribution imparting rate and the distribution fixing profile can be held constant. As a method of removing an eluted solution component, it is possible to employ separation by using an ion-exchange resin, a polymer membrane or distillation.

As the ion-exchange resin material, an appropriate material may be selected according to the polarity of a solution component contained in the gel or the distribution imparting solution, together with the magnitude thereof. However, it is particularly preferable to use a material in which at least one group selected from among an octadecyl group, an octyl group, a cyanopropyl group and a methyl group is chemically bonded to silica gel or a polymer, for the reason that such a material has an electric charge of appropriate magnitude and a suitable physical structure. The use of such an ion-exchange resin material enables various low-molecular weight organic compounds to be separated from each other. A stationary phase (octadecyl group or octyl group) of the ion-exchange resin material or a pore diameter should be selected according to the kind of compound to be separated.

In the foregoing, methods of removing a solution component eluted into the solution from the gel have been described. It is most preferable to remove the eluted solution component completely. However, it is not always necessary to completely remove the solution component. It will suffice to remove the eluted solution component to such an extent that the desired distribution profile can be obtained.

In the case of the above (4), that is, in a case where a component diffused into the gel from the solution is supplemented:

As has been described above, in a case where a gel having crystallites of metal species A precipitated therein is immersed in a distribution imparting solution containing metal species B to thereby impart a distribution to the metal species A, the metal species A in the gel gradually diffuse into the distribution imparting solution. On the other hand, the metal species B in the distribution imparting solution gradually diffuse into the gel. Accordingly, the concentration of the metal species B in the distribution imparting solution gradually lowers. The change in the concentration causes a change in the condition of elution of the metal species A and B, thus giving an adverse effect on the distribution profile of the metal species A and B. However, since the quantity of the distribution imparting solution is usually set to be from several to several tens of times the volume of the gel, the change of the metal species concentration in the distribution imparting solution caused by the diffusion of the metal species B into the gel is so small as to be ignorable. However, when both the metal species A and B are components which contribute largely to the refractive index, or when a particularly precise distribution profile control is demanded, it is necessary to eliminate the change with the gel immersing time of the concentration of the metal species B in the distribution imparting solution. For this purpose, it is preferable to keep the concentration constant by adding to the distribution imparting solution an amount of metal species B corresponding to the amount of metal species B diffused into the gel. By doing so, the metal species B can be urged to diffuse at a constant rate at all times.

In the case of the above (5), that is, in a case where relatively large impurities such as large gel fragments and dust particles are removed:

Gel fragments floating in the solution are divided into fine particles by stirring, thus producing a significant effect on the solubility and other factors. Therefore, it is most preferable to remove gel fragments in the early stages where they are still relatively large pieces. In addition, if dust particles are removed, the way in which the solution comes in contact with the gel can be held constant. Therefore, it becomes possible to realize uniform immersing treatment, and thus the condition of the resulting gel is stabilized. As a method of removing these foreign substances, mechanical separation is effective. For example, filtration, sedimentation, coagulation, etc. may be selected. The size of foreign matter which can be removed by these methods is on the order of from several micrometers to several millimeters. The foreign matter removing methods will be explained below.

Filtration methods include precision filtration and ultrafiltration. Filtration can be effected by using any material having holes of predetermined size, such as a filter. However, it is preferable to use an organic polymer filter made, for example, of Teflon from the viewpoint of general-purpose properties. In terms of the configuration of filters, it is possible to use a flat membrane, a hollow fiber membrane, a tubular membrane, a monolithic membrane, etc. In filtration, foreign substances can be removed even more rapidly by removing them after the solution has been passed through the filter under application of pressure by using a pump or the like in order to ensure a sufficient flow rate.

Figure 14:
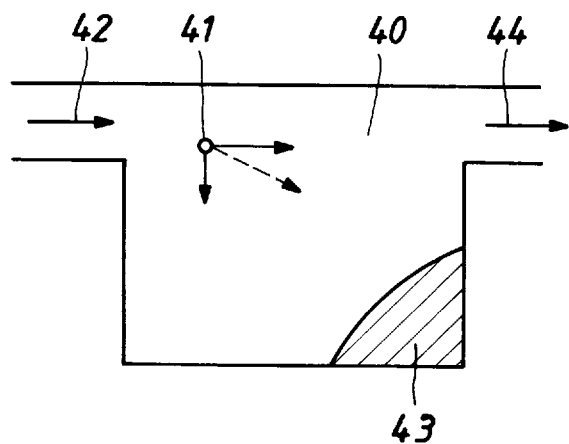
FIGS. 14(a) and 14(b) are sectional views each showing a device for sedimenting a foreign substance in a process of immersing a gel in a solution.
Figure 14:
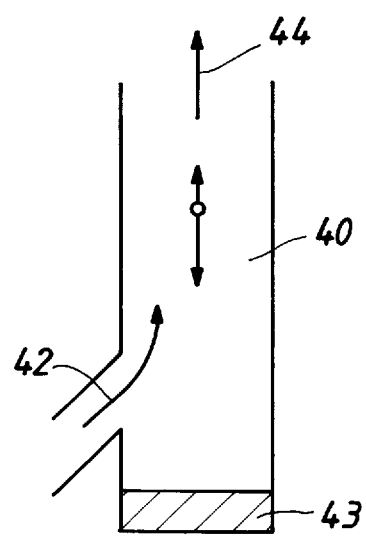

A sedimentation method usable in the present invention is as follows: As shown in FIG. 14($a$), a solution 42 containing a suspensoid 41 such as gel fragment is allowed to reside in a settling tank 40 for a predetermined time while being supplied from one end of the tank 40. Consequently, the suspensoid 41 settles by gravity to form sediment 43 in the bottom of the settling tank 40, thereby separating from the solution 42. On the other hand, the purified solution 44 which has no or minimized suspensoid 41 flows out from the other end of the tank 40. In a settling tank such as that shown in FIG. 14($b$), a solution containing a suspensoid is allowed to flow from the lower end to the upper end of the tank 40, thereby sedimentarily separating a suspensoid whose settling speed is higher than the flow velocity of the ascending current of the solution. The size of foreign substances which can be removed by the methods shown in FIGS. 14($a$) and 14($b$) can be adjusted by changing the size of the settling tank, the flow velocity of the solution, etc.

Examples of coagulation methods include: a method in which foreign substances are removed by adding to a suspension a coagulant which removes an inhibiting factor, e.g. repulsive force, in coagulation of a hydrophobic colloid or the like; and a method which employs a polymer coagulant or the like whereby particle diameters are increased by an amount corresponding to the amount of polymer adsorbed on the particle surfaces, thereby making it easy for the particles to contact each other, and thus causing coagulation between the particles. Examples of coagulants usable in the present invention are inorganic salts such as aluminum chloride, and surface-active agents such as aniline hydrochloride. Examples of usable polymer coagulants include polyhexamethylene thiourea acetate, etc.

Although the present invention has been described above according to a method which is stated in U.S. Pat. No. 4,686,195, in which the present invention exhibits its effect most powerfully, it should be noted that the present invention can also effectively be applied to the method of Japanese Patent Application Post-Examination Publication No. 2-39454, in which a gel is immersed in an organic compound, and to the method which is reported in Elect. Lett. 22 (1986), p.1108.

Further, since the method of producing a distributed index optical element involves many problems such as those described above, it is preferable to use some device as described below when taking into consideration a process in which a gel is actually prepared and immersed in a solution, more specifically, a process in which a metal crystallite precipitating process and a distribution imparting process are continuously carried out in a single treating container. That is, it is preferable to use a part for removing a component eluted into the solution from the gel and/or a foreign substance produced or mixed in the solution during the solution immersing process, and/or a device whereby a component diffused into the gel from the solution is supplemented to the solution. For example, the process in which metal salt crystallites are precipitated in a gel requires a part at which a component eluted into the solution from the gel and/or a foreign substance produced or mixed in the solution during the solution immersing process is separated by the above-described filter or ion-exchange resin material. In the distribution imparting process, it is effective to use a device for supplementing a component diffused into the gel from the solution to the solution, in addition to the above-described part.

[EMBODIMENTS]

(Embodiment 1)

Tetraethoxysilane $Si(OC_2H_5)$, lead acetate $Pb(CH_3COO)_2 \cdot 3H_2O$, barium nitrate $Ba(NO_3)_2$ are used as materials of silicon, lead and barium. Ethanol 10 ml, 0.1N hydrochloric acid 9.6 ml are added to $Si(OC_2H_5)_4$ 25.0 g, and they are stirred at room temperature for one hour. Added to the resultant solution is a solution obtained by mixing 1.25M-$Pb(OCOCH_3)_2$ aqueous solution 8 ml, 1M-barium nitrate aqueous solution 8 ml and lactic acid 12 ml, and they are stirred for one hour, thereby obtaining a sol. This sol is cast into a polypropylene tube container having a diameter of 18 mm and left as it is in a constant temperature oven at 30° C., thus gelling the sol. Thereafter, this is further aged.

Next, the thus obtained gel is taken out of the container, and ten pieces of gels are immersed in a solution obtained by mixing ethanol 400 ml and lactic acid 7.2 g by use of an apparatus having a structure shown in FIG. 1. Membrane filter 9 involves the use of a plane membrane formed of Teflon having holes each of 5 μm in diameter. An ion exchanging resin 6 involves the use of polystyrenesulfonate type cation exchange resin. An ion exchange resin 7 involves the use of an ion exchange resin employing octadecyl as a solid phase. A metal fixing solution is caused to pass through portions of the ion exchange resins 6, 7 at a fixed speed by use of a pump and again reverts to the metal fixing solution. Although two pieces of gels have been split with a passage of half a day since the start of the immersion, the treatment continues as it is. For the duration of totally two-days immersion, there can be obtained ten pieces of gels in which crystallites of lead acetate and barium nitrate are fixed. These gels are dried and sintered, thereby obtaining a glass material exhibiting no crack and having a refractive index as high as 1.72.

(Comparative Example 1)

The gel is obtained by the same processes as those in the embodiment 1. The ten pieces of gels are immersed in a solution obtained by mixing ethanol 400 ml and lactic acid 7.2 g without passing through a filter and an ion exchange resin. One piece of gel has been split in half a day since the start of the immersion, and one piece of gel has been split in one day. Totally two pieces of gels have been split, but the treatment continues as it is. The gels have been immersed therein for two days, and the crystallites of lead acetate and barium nitrate are fixed in the gels. In this comparative example, from the above treatment, rough and large crystals of lead acetate and barium nitrate have been precipitated in three gels among the eight gels. These gels are dried and sintered, whereby five pieces of glass materials can be obtained. There is a scatter in terms of refractive index of these glasses.

This is derived from the fact that lead ions and barium ions excessively flow from the gels split during the immersion in a short time, and lead and barium concentrations of the metal fixing solution are saturated. It can be considered that the rough and large crystals of lead acetate and barium nitrate are thereby precipitated in the gels.

(Embodiment 2)

The gel is obtained by the same processes as those in the embodiment 1. On the other hand, molecular sieve formed with a hole diameter as small as 0.4 nm is beforehand subjected to a thermal treatment for 48 hours, and the ten gels are immersed in the solution obtained by mixing ethanol 400 ml and lactic acid 7.2 g. One piece of gel has been split in approximately 3 hours since the start of the immersion, and one piece of gel has been split in one day. Totally two pieces of gels have been split, but the treatment continues as it is. For the duration of totally two-days immersion, the crystallites barium nitrate have been fixed in the gels. Remaining eight gels are all well-conditioned. These gels are dried and sintered, whereby 5.0 mm-diameter glass materials having a uniform refractive index are obtained.

(Embodiment 3)

Tetramethoxysilane $Si(OCH_3)_4$, titanium butoxide monomer $Ti(O-nC_4H_9)_4$, barium acetate $Ba(OCOCH_3)_2$ and potassium acetate $KOCOCH3$ are used as materials of silicon, titanium, barium and potassium. Ethanol 35 ml and 2N hydrochloric acid 4.8 ml are added to $Si(OCH_3)_4$ 20.9 g, and they are stirred at room temperature for one hour. Added to the resultant solution is a solution obtained by mixing $Ti(O-nC_4H_9)_4$ 7.7 g and ethanol 35 ml, and they are stirred for one hour. Added to this solution are 1M-barium acetate aqueous solution 40 ml and 17N acetic acid 16 ml, and they are stirred for one hour, thereby obtaining a sol. This sol is cast into ten pieces of polypropylene containers having the diameter of 18 mm and left as they are in the constant temperature oven at 50° C., thus gelling the sol. Thereafter, this is further aged. These gels are taken out of the containers, and ten pieces of gels are immersed in the solution obtained by mixing ethanol 400 ml and lactic acid 7.2 g for two days, and the crystallites of the barium acetate have been fixed in the gels.

On the other hand, there is prepared a solution obtained by mixing potassium acetate 47 g and methanol 800 ml. The gels are immersed in this solution by use of the same apparatus as that shown in FIG. 2. An ion exchanging resin 31 in the apparatus involves the use of polystyrenesulfonate type cation exchange resin. A distribution imparting solution passes a portion of the ion exchange resin 31 at a fixed speed by use of the pump, adsorbs barium eluted out of the gels and turns out a solution containing only potassium. The immersion is effected for 8 hours, with the result that a convex distribution is imparted to the barium component in the gel, while a concave distribution is imparted to the potassium component therein. Thereafter, the gels have been again immersed in the solution obtained by mixing ethanol 400 ml and lactic acid 0.72 g in two days. The crystallites of barium acetate and potassium acetate are fixed, dried and sintered, thereby obtaining a transparent 5.0 mm-diameter glass material with no crack.

As a result of analyzing compositions of this glass material in the radial direction of the glass by use of EDX (Energy Distributed X-ray spectrum analysis), it is found that there can be obtained such a desired metal concentration distribution that a barium concentration parabolically decreases in the outer peripheral direction from the center of the glass material. A distributed index optical element exhibiting an excellent optical characteristic can be obtained.

(Comparative Example 2)

The gel manufactured by the same processes as those in the embodiment 3 is to be manufactured by performing only a liquid circulation based on the agitation without any passage of the ion exchange resin. With respect to the glass material in which the immersion into the distribution solution has been effected for 8 hours as in the embodiment 3, barium is slowly eluted out, but barium in the vicinity of the center is not eluted out with the result that a flat portion is left. Next, similarly with respect to the glass in which the immersion has been carried out for 12 hours, the glass material exhibiting substantially the same refractive index as that in the embodiment 3 at the central portion can be obtained. There is, however, such a metal distribution that an inflection point is present having a skirt portion in the vicinity of the outer peripheral portion, and there can not be obtained the distributed index optical element exhibiting a small difference between the refractive indexes but an excellent optical characteristic.

(Embodiment 4)

Tetraethoxysilane $Si(OC_2H_5)_4$, barium nitrate $Ba(NO_3)_2$ and sodium acetate $NaCOCH_3$ are used as materials of silicon, barium and sodium. Ethanol 10 ml, and 0.1N hydrochloric acid 9.6 ml are added to $Si(OC_2H_5)_4$ 25.0 g, and they are stirred at room temperature for one hour. Added to this solution is a solution obtained by mixing 1.25M barium nitrate 64 ml and lactic acid 12 ml, and they are stirred for one hour, thereby obtaining the sol. This sol is cast into the polypropylene tube container having the diameter of 18 mm and left as it is in the constant temperature oven at 30° C., thus gelling the sol. Thereafter, this is further aged.

Next, the thus obtained gel is taken out of the container, and the gel is immersed in a solution obtained by mixing 1M-sodium nitrate solution 200 ml, methanol 400 ml and lactic acid 7.2 g. A filter member 9 involves the use of a flat membrane of a polyimide series exhibiting a high chemicalproof property against a solvent of an organic solvent series. Referring to FIG. 15 of a conceptual diagram showing the flat membrane, the solvent flows in a direction horizontal to the membrane, and, hence an effective separation of foreign substances can be made without decreasing a flow velocity.

Chelating resin involves the use of Dia Ion CR-10 m (trade name, made by Mitsubishi Chemical Industry Co., Ltd.) containing imino diacetic acid base, and barium eluted out of the gel is adsorbed. Measured is a sodium concentration of a solution flowing out of the chelating resin, and there is added sodium nitrate equivalent to a quantity reduced due to adsorption to the chelating resin or diffused into the gel. The sodium concentration is thus kept uniform. The immersion is effected for 10 hours, with the result that a concave distribution is imparted to the barium component in the gel, while a concave distribution is imparted to the sodium component therein. This gel is immersed in isopropanol in one day, and crystallites of barium nitrate and sodium nitrate are fixed, dried and sintered, thereby obtaining a glass material having a diameter of 0.5 mm. As a result of analyzing compositions of this glass material in the radial direction of the glass by use of EDX, it is found that there can be obtained such a desired metal concentration distribution that the barium concentration parabolically decreases in the outer peripheral direction from the center of the glass material. The distributed index optical element exhibiting the excellent optical characteristic can be obtained.

(Embodiment 5)

0.01N hydrochloric acid aqueous solution 25 ml is added to tetraethoxysilane 50 ml, and they are agitated for one hour. Added to this solution is a solution obtained by mixing 2N sodium acetate aqueous solution 134.5 ml, 1.2N lead acetate aqueous solution and acetic acid 61.4 ml, and they are intensively stirred for 3 minutes. Thereafter, they are set in a still-standing state and poured into a polypropylene test tube having a diameter of 18 mm. This gel is immersed sequentially in IPA : acetone=5:5 solution and acetone, whereby the crystallites of sodium acetate and lead acetate are precipitated in the gel.

Figure 5:
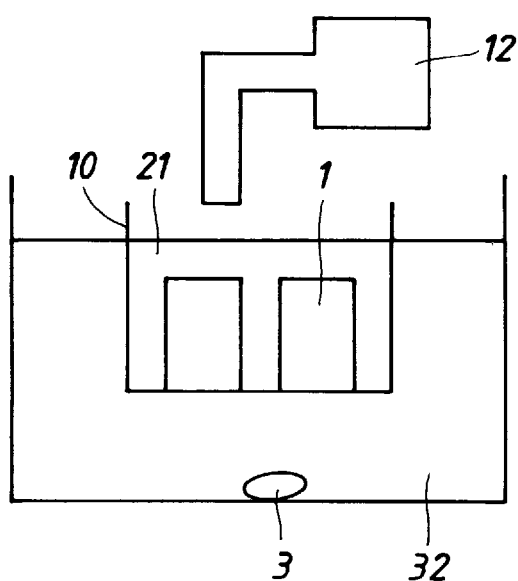
FIG. 5 schematically shows the arrangement of an immersing apparatus employed in Example 5.

A distribution is imparted by use of the apparatus shown in FIG. 5. In the distribution imparting solution, as a mosaic electric charge membrane 10, Desalton MC membrane 10 (made by Toso Co., Ltd.) is provided around the gel, wherein the cation exchange portion involves the use of sodium polystyrenesulfonate, the cation exchange portion also involves the use of polychloro-4-vinylbenzyldimethylamine, and an insulating portion uses crosslinked polydiene. Pure water 5 liters is poured into a container outside the membrane, and a methanol solution of 0.2 mol/l lead acetate is put as a distribution imparting solution 21 into the membrane. The methanol solution of 0.2 mol/l lead acetate is added to the inside of the membrane by 1 ml at an interval of 10 minutes from a metal species adding portion 12, and the gel is immersed for 2 hours while being stirred.

This gel is immersed sequentially in IPA : acetone=5:5 solution, acetone and acetone each for 2 days, whereby the crystallites of lead acetate and sodium acetate are precipitated in the gel fine holes and then fixed. The crystallites are dried at 30° C. for 5 days and thereafter sintered, thereby obtaining a colorless transparent glass material with no crack. When measuring a distribution of this glass material in the radial direction, there is obtained the distributed index optical element in which the refractive index simply increases from the central portion toward the outer peripheral portion.

This membrane is capable of freely transmitting sodium but does not transmit lead, and, hence, intramembrane sodium is diffused into the pure water, resulting in an extremely small concentration. It can be, considered that the concentration of lead can be kept substantially uniform without exiting the membrane.

(Embodiment 6)

The gel is obtained by the same processes as those in the embodiment 3. Previously, 21-crown-7 ether is added to the solution obtained by mixing ethanol 400 ml and lactic acid 7.2 g. The ten pieces of gels are immersed in 2 days, and the crystallites of barium acetate are fixed in the gel. This gel is dried and sintered, thereby obtaining the 5.0 mm-diameter glass material with a uniform refractive index.

(Embodiment 7)

Figure 6:
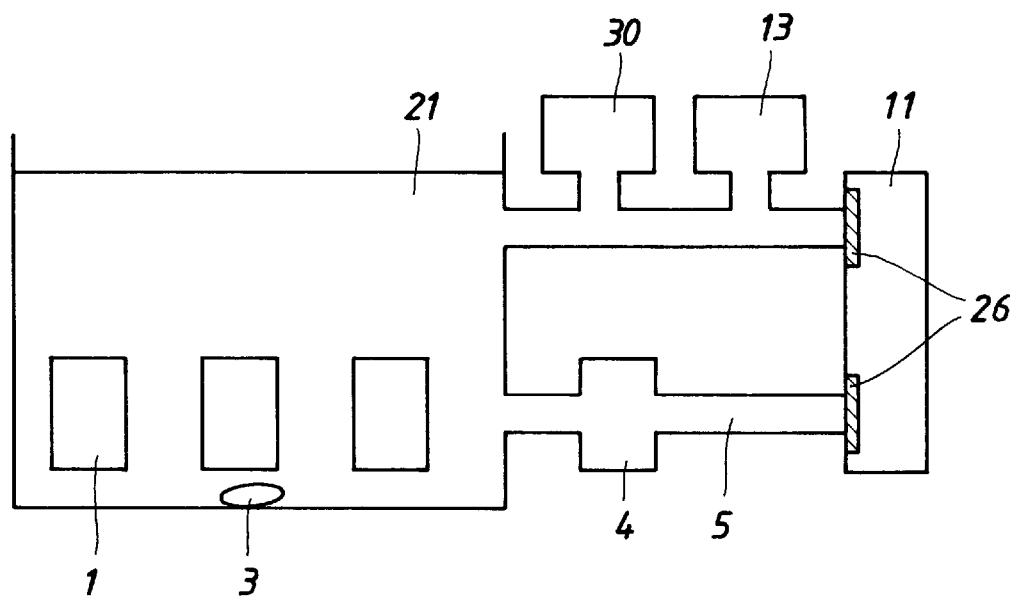
FIG. 6 schematically shows the arrangement of an immersing apparatus employed in Example 7.

The gel wherein the crystallites of barium acetate are precipitated is manufactured by the same processes as those in the embodiment 3. This gel is immersed in a solution obtained by dissolving potassium acetate 47 g in methanol 800 ml. An immersing apparatus illustrated in FIG. 6 is provided with a metal salt precipitation chamber 11 wherein 1N sulfuric acid is added 6 ml/hr. Sulfuric acid reacts with barium, with the result that white precipitates of insoluble barium sulfate can be seen. These precipitates are filtered by a membrane filter 26, and pH of the filtrate is measured by a pH meter 13. Then, 1N potassium hydroxide is added to the filtrate from the metal adding portion 12, thus making the solution revert to original pH and back to the distribution imparting solution 21. With an 8-hour immersion, the convex distribution is imparted to the barium component in the gel, while the concave distribution is imparted to the potassium component therein. Thereafter, the gels have been again immersed in the solution obtained by mixing ethanol 400 ml and lactic acid 7.2 g in two days. The crystallites of barium acetate and potassium acetate are fixed, dried and sintered, thereby obtaining a transparent 5.0 mm-diameter glass material with no crack.

As a result of analyzing compositions of this glass material in the radial direction of the glass by use of EDX, it is found that there can be obtained such a desired metal concentration distribution that the barium concentration parabolically decreases in the outer peripheral direction from the center of the glass material. The distributed index optical element exhibiting an excellent optical characteristic can be obtained.

(Embodiment 8)

Tetramethoxysilane 30 ml and tetraethoxysilane 30 ml are mixed, and 1/100N hydrochloric acid solution 25 ml is added thereto. They are stirred at room temperature for one hour, thus effecting partial hydrolysis reaction. Added to this is a mixture of 1.25 mol/l lead acetic acid solution 107.6 ml and acetate 15.4 ml. This is further intensively stirred at room temperature and thereafter poured into the Teflon container having a diameter of 30 mm. This is, after being gelled, aged in five days in a constant temperature drier at 30° C.

Next, this gel is immersed in 0.61 mol/l lead acetate solution using a mix solvent of IPA : water=8 : 2, and the gel is aged and acetic acid removed. This gel is immersed sequentially in IPA, IPA : acetone=8 : 2, 5 : 5, acetone each in two days, thereby precipitating and fixing the crystallites of lead acetate in the gel fine holes.

Figure 7:
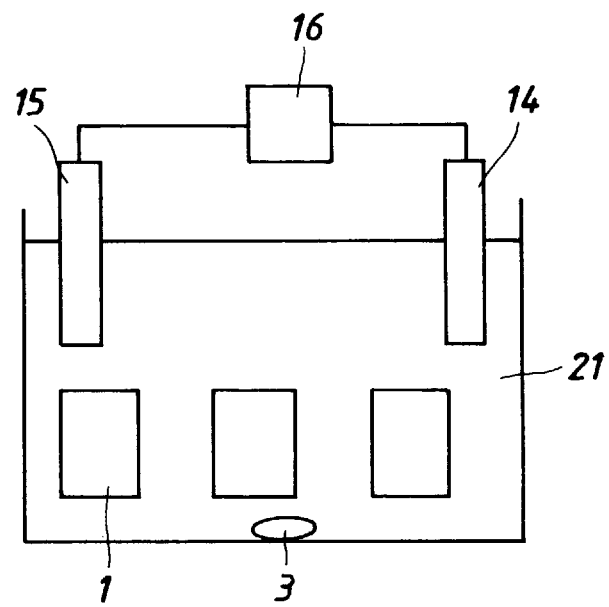
FIG. 7 schematically shows the arrangement of an immersing apparatus employed in Example 8.

The gel is immersed in ethanol solution 150 ml of potassium acetate 0.305 mol/l for 8 hours to impart a distribution by use of the apparatus illustrated in FIG. 7. Electrode plates 14, 15 composed of copper and zinc are provided in the distribution imparting solution 21. The gel is immersed while flowing a direct current to these electrode plates 14, 15 from a power supply 16. Crystals of metal lead are precipitated in the electrode plates with a passage of immersing time.

Thereafter, the gel is immersed sequentially in IPA acetone=5 : 5, acetone, acetone each in two days, thereby precipitating and fixing the crystallites of lead acetate and potassium acetate in the gel fine holes. This is dried at 30° C. in five days, and, thereafter, the temperature is increased up to 570° C., thus sintering it. A colorless transparent glass material of φ11.4 mm with no crack is thereby obtained. When measuring a distribution of the refractive index of this glass material in the radial direction, there is obtained a distributed index optical element wherein a value of the refractive index of the central portion is 1.712, the refractive index simply decreases from the central portion toward the outer peripheral portion, and Δn=0.1.

(Comparative Example 3)

The gel manufactured by the same processes as those in the embodiment 88 is immersed in ethanol solution 150 ml of potassium acetate 0.305 mol/l for 8 hours without using any electrode, and a distribution is imparted. Thereafter, as in the same way with the embodiment 8, the gel is immersed in IPA and acetone solution and then sintered. When measuring a distribution of the refractive index of this glass material in the radial direction, a value of the refractive index of the central portion is 1.709 that is substantially the same as the value of the glass obtained in the embodiment 8, but the metal distribution exhibits an inflection point having a skirt portion in the vicinity of the outer peripheral portion, and Δn=0.07.

(Embodiment 9)

Figure 8:
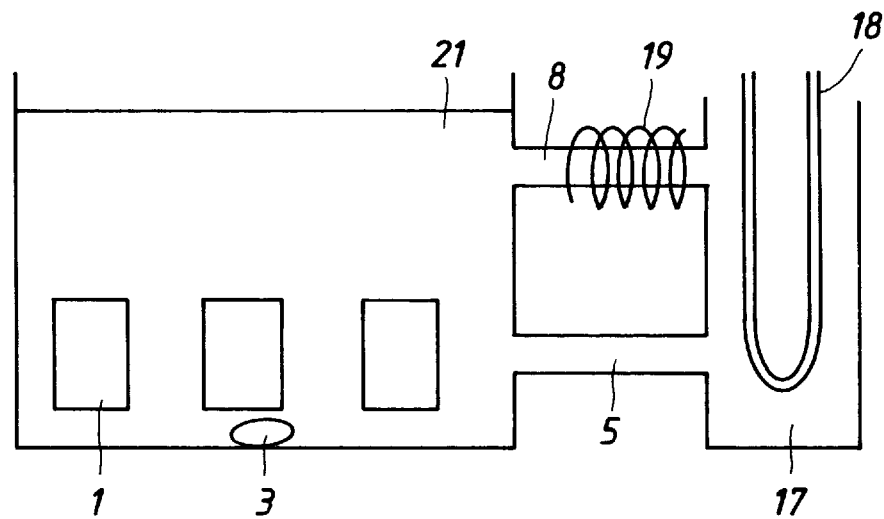
FIG. 8 schematically shows the arrangement of an immersing apparatus employed in Example 9.

The gel manufactured by the same processes as those in the embodiment 8 is immersed by use of the apparatus shown in FIG. 8. The gel is immersed in ethanol solution 150 ml of potassium acetate 0.305 mol/l, and a distribution is imparted. The distribution imparting solution 21 is held at 30° C. in a water bath. The distribution imparting solution 21 enters a cooling chamber 17 via a pipe 5. A U-shaped pipe 18 slowly but consecutively moved is arranged in the cooling chamber 17. Ethylene glycol having approximately −10° C. is so supplied to the interior of this pipe 18 as to be slowly but consecutively moved. A solution containing a metal species A decreases in temperature upon contacting the U-shaped pipe 18, while a solubility of the metal species A drops down, and hence crystals of metallic salt A are precipitated in the U-shaped pipe 18. This solution gets back to 30° C. by making it pass through a pipe 8 including a heater 19, thus reverting the distribution imparting solution 21. The gel is, after being immersed in for 8 hours, further immersed in IPA and the acetone solution and then sintered as in the same way with the embodiment 8. When measuring a refractive index distribution of the glass material in the radial direction, there is obtained a distributed index optical element wherein a value of the refractive index of the central portion is 1.714 that is substantially the same as that of the glass obtained in the embodiment 8, a substantially parabolic metal distribution is exhibited, and Δn=0.1

(Embodiment 10)

$Si(OCH_3)_4$ and $Zr(O-nC_4H_9)_4$ are employed as materials of silica and zirconia. Methanol 9.2 g and 1N hydrochloric acid 1.26 g are added to $Si(OCH_3)_4$ 10.6 g, and they are stirred for one hour at 30° C. Added to this solution is a solution obtained by mixing Zr(O-nC$_4$H$_9$)$_4$ 5.75 g and isopropanol 15.0 g, and they are stirred for one hour. Dropped thereafter is a solution obtained by mixing 1N Ba(NO$_3$)$_2$ aqueous solution 15 ml, 1N nitric acid 3 ml and ethanol 23.0 g, thereby obtaining a sol. This sol is cast into the polypropylene tube container having a diameter of 18 mm and left as it is in the constant temperature oven at 50° C., thus gelling the sol. Thereafter, this is further is aged. The thus obtained gel is taken out of the container. Ten pieces of gels are immersed in a solution obtained by mixing ethanol 200 ml and lactic acid 3.6 g in one day, and the crystallites or barium nitrate are fixed in the gels. On the other hand, there is prepared a solution in which potassium acetate 23.5 g and methanol 400 ml are mixed and dissolved, and the gel is immersed in this solution for 4 hours, with the result that a convex distribution is imparted to the barium component in the gel, while a concave distribution is imparted to the potassium component therein.

Thereafter, this gel is immersed in acetone 150 ml by using the apparatus shown in FIG. 2. The ion exchange resin 31 in the apparatus involves the use of silica as a basic material, octadecyl for a solid phase and TSK-GEL (made by TOSO Co., Ltd.) in which the fine hole diameter is an antiphase diameter of 12 nm. The distribution fixing solution passes through the ion exchange resin 31 at a fixed velocity and adsorbs methanol eluted out of the gel, resulting in a solution containing acetone and isopropanol. With a one-day immersion, distribution of the barium component and potassium component in the gel are fixed. Thereafter, the gel is dried and sintered, thereby obtaining ten pieces of transparent glass materials having a diameter of 3.8 mm with no crack.

As a result of analyzing compositions of this glass material in the radial direction of the glass by use of EDX, it is found that there can be obtained such a desired metal concentration distribution that the barium concentration parabolically decreases in the outer peripheral direction from the center of the glass material. A distributed index optical element exhibiting an excellent optical characteristic can be obtained.

(Comparative Example 4)

In the gel manufactured by the same processes as those in the embodiment 10, the distribution fixing is performed by effecting only the liquid circulation with an agitation without passing through the ion exchange resin. Thereafter, the gel is dried and sintered, thereby obtaining six pieces of glasses exhibiting substantially the same refractive index as that in the embodiment 9 at the central portion. Four pieces of glasses, however, have flaws or cracking in the surfaces thereof. As a result of analyzing compositions of this glass material in the radial direction of the glass by use of EDX, there is seen such a distribution that the potassium concentration does not parabolically increase in the outer peripheral direction from the center of the glass material, but an inflection point is provided. This is, it can be considered, derived from the fact that the solubility increases because of methanol being eluted out of the gel, and the potassium distribution changes. This being a cause, it is presumed that the cracks are produced by a stress generated when the gel is sintered.

(Embodiment 11)

The gel manufactured by the same processes as those in the embodiment 3 is taken out of the container and immersed in a solution obtained by mixing ethanol 400 ml and lactic acid 7.2 g, and the crystallites of barium salt are fixed. Thereafter, the gel is stirred in a solution obtained by mixing methanol solution of 0.1M-lead acetate and lactic acid 7.2 g, and a convex distribution is imparted to the barium component, while a concave distribution is imparted to the lead component.

Figure 9:
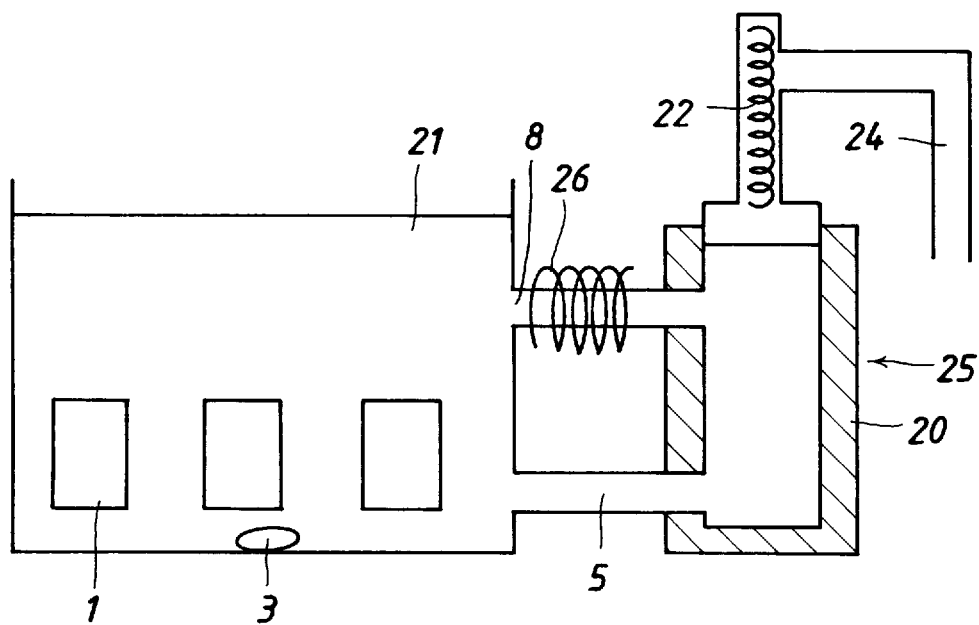
FIG. 9 schematically shows the arrangement of an immersing apparatus employed in Example 11.
Figure 10:
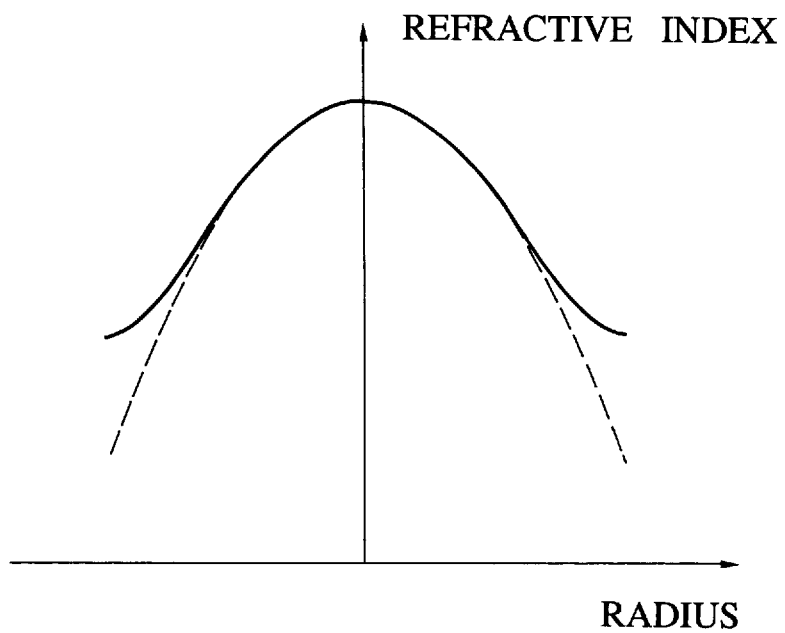
FIG. 10 is a graph showing a desired parabolic distribution profile, and a distribution profile in which the refractive index distribution curve is undesirably inflected at the peripheral portion of a distributed index optical element.
Figure 11:
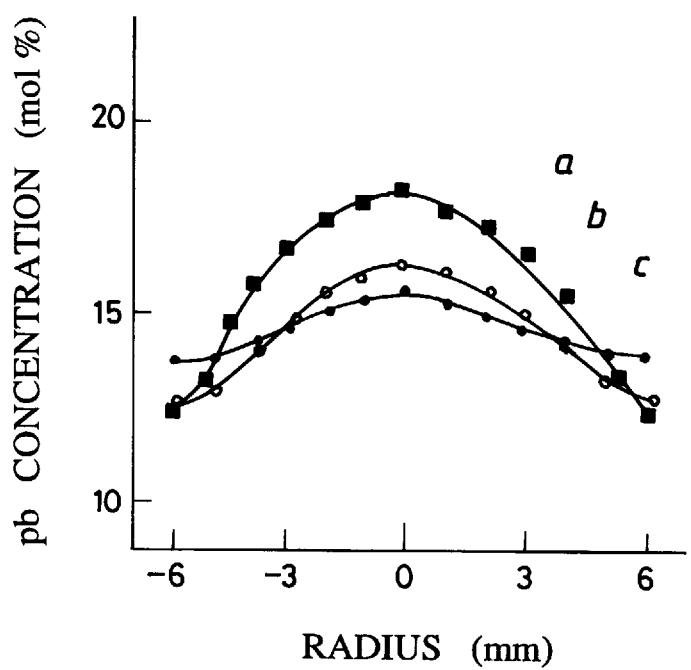
FIG. 11 is a graph showing the change with immersing time of the metal concentration distribution of a distributed index optical element produced by a conventional method.
Figure 12:
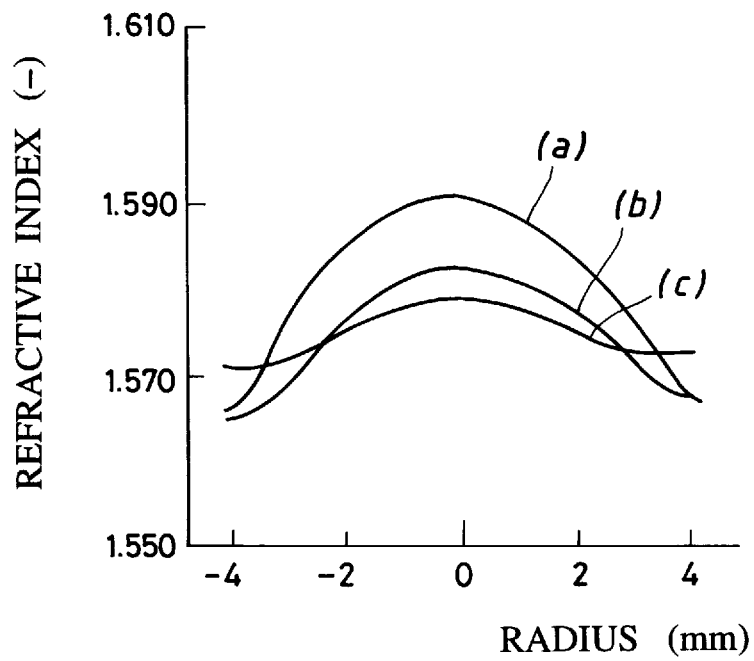
FIG. 12 is a graph showing the change with immersing time of the refractive index distribution of a distributed index optical element produced by a conventional method.
Figure 13:
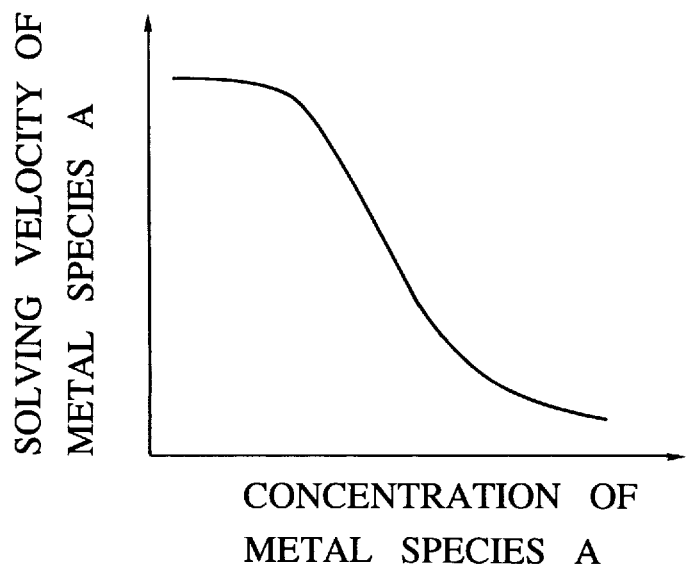
FIG. 13 is a graph showing the relationship between the amount of metal species A eluted when a gel containing the metal species A is immersed in a distribution imparting solution, and the solubility of the metal species A.

This gel is immersed in IPA 300 ml by use of the apparatus illustrated in FIG. 9. A distilling column 25 is provided in the apparatus, and the distribution imparting solution 21 is heated by a mantle heater 20. Only methanol having a low boiling point is distilled by a distilling tube 22 and fractionated by a fractionating tube 24. The remaining solution is cooled off by a cooler 26 and again mixed with the distribution fixing solution 21 via the pipe 8. With a one-day immersion, the distributions of the barium component and the lead component in the gel are fixed.

Thereafter, the gel is dried and sintered, thereby obtaining ten pieces of transparent glass materials having a diameter of 3.8 mm with no crack. As a result of analyzing compositions of this glass material in the radial direction of the glass by use of EDX, it is found that there can be obtained a distributed index optical element exhibiting an excellent optical characteristic in terms of a desired metal concentration distribution wherein barium parabolically decreases in the outer peripheral direction from the center of the glass material, while lead parabolically increases. This is, it can be considered, derived from the fact that the solubility does not increase because of removing methanol eluted out of the gel but defined as a distribution imparting solution, and the distributions of barium and lead on the basis of IPA can be fixed.

(Embodiment 12)

Figure 16:
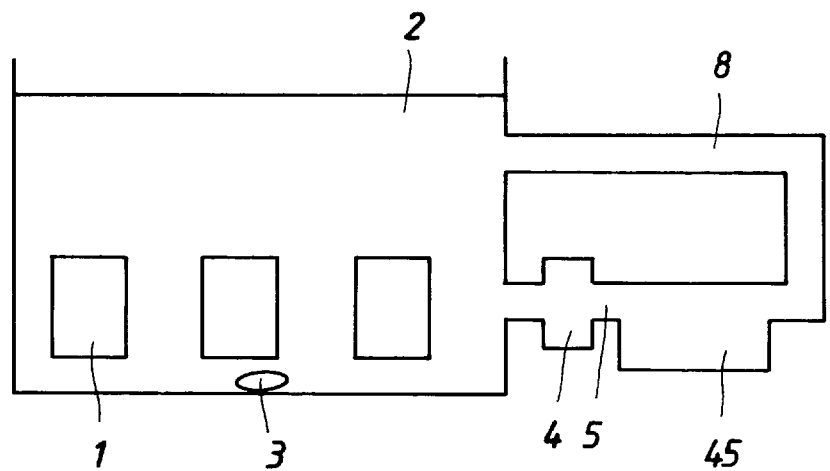
FIG. 16 schematically shows the arrangement of an immersing apparatus employed in Example 12.

Tetramethoxysilane Si(OCH$_3$)$_4$ and titanium butoxide monomer Ti(O-nC$_4$H$_9$)$_4$ are used as materials of silicon and titanium. Ethanol 350 ml and 2N hydrochloric acid 48 ml are added to Si(OCH$_3$)$_4$ 209 g, and they are stirred at room temperature for one hour. Added to this solution is a solution obtained by mixing Ti(O-nC$_4$H$_9$)$_4$ 77 g and ethanol 350 ml, and they are stirred for one hour. Water 400 ml is added to this solution and stirred for 20 minutes, thereby obtaining a sol. These sols are cast into 400 pieces of polypropylene containers having a diameter of 12 mm and left as they are in a constant temperature oven at 40° C., thus gelling them. They are further aged. The thus obtained gels are immersed at one time in 0.1N hydrochloric acid 800 ml for 3 hours in a single piece of container provided with a settling tank 45 as shown in FIG. 16, and a convex distribution is imparted to the titanium component in the gel. Several gels have been split due to a mistake of handling when transferring the gels into the container, with the result that gel fragments and dusts, though afloat in the distribution imparting solution, are removed by the settling tank 45. Thereafter, the gels have been immersed in ethanol in one day. These gels are dried and sintered, thereby obtaining a large quantity of transparent refractive index distribution glass materials each having a diameter of 3.0 mm with no crack.

(Comparative Example 5)

As a result of manufacturing the glass by stirring the distribution imparting solution without removing the gel fragments and providing the settling tank 45 as in the prior art in accordance with the embodiment 12, approximately 150 pieces of transparent glass materials each having a diameter of 3.0 mm with no crack are obtainable. However, 50 pieces of glass materials have been split, while surface of 200 glass materials are colored slightly in white, or anatase crystals of titanium have been precipitated enough to devitrify the glasses, or the glasses have been split. As compared with the embodiment 12, it can be considered that the gel fragments have turned out a nucleating agent of the titanium crystals.

(Embodiment 13)

The gel is manufactured in the same way with the embodiment 12. When imparting a distribution to titanium, a stirring velocity of the distribution imparting solution is set faster than in the embodiment 12, and a trace of aluminum chloride is added to the distribution imparting solution. The gel fragments thereby have turned out a large mass to some extent and have been deposited down to the bottom of the settling tank 45. Thereafter, a preferable glass material can be obtained by performing the same treatments as those in the embodiment 12.

(Embodiment 14)

The gel is manufactured in the same way with the embodiment 12. When imparting a distribution to titanium, the stirring speed of the distribution imparting solution is set faster than in the embodiment 12, and a trace of aniline formaldehyde polymer hydrochloride is added to the distribution imparting solution. The gel fragments thereby have turned out a large mass to some extent and have been deposited down to the bottom of the settling tank 45. Thereafter, a preferable glass material can be obtained by performing the same treatments as those in the embodiment 12.

As discussed above, according to the present invention, the glass material exhibiting the stable quality in terms of the refractive index, etc. can be easily obtained within a short period of time. Further, it is possible to obtain the distributed index optical element exhibiting the stable quality in terms of the refractive index distribution, etc.

It is apparent that, in this invention, a wise range of different working modes can be formed based on the invention without deviating from the spirit and scope of the invention. This invention is not restricted by its specific working modes except being limited by the appended claims.

What is claimed is:

1. A method of making a glass material, said method comprising the steps of:
   providing a wet gel prepared from a sol;
   immersing the wet gel in a solution containing at least one substance selected from the group consisting of an organic solvent, water, an acid, and an alkali, or in a solution having a metal salt dissolved in the at least one substance selected from the group, and eluting at least one component into the solution from the gel while removing the at least one component eluted into the solution from the gel and/or any foreign substance which is produced or mixed in the solution during said step of eluting, said step of removing the at least one component eluted into the solution being conducted so that the eluted component does not impair a rate of elution of the at least one component; and
   drying and sintering the gel having undergone said steps of immersing and eluting to thereby obtain a glass material,
   wherein the at least one component eluted into the solution from the gel is removed by a trapping member.

2. A method of making a glass material according to claim 1, wherein the trapping member comprises an ion-exchange resin material.

3. A method of making a glass material, said method comprising the steps of:
   providing a wet gel prepared from a sol;
   immersing the wet gel in a solution containing at least one substance selected from the group consisting of an organic solvent, water, an acid, and an alkali, or in a solution having a metal salt dissolved in the at least one substance selected from the group, and diffusing at least one component into the gel from the solution while supplementing the at least one component diffused into the gel from the solution to maintain constant a concentration of the at least one component during said step of diffusing; and
   drying and sintering the gel having undergone said steps of immersing and diffusing to thereby obtain a glass material.

4. A method of making a glass material, said method comprising the steps of:
   providing a wet gel prepared from a sol;
   immersing the wet gel in a solution containing at least one substance selected from the group consisting of an organic solvent, water, an acid, and an alkali, or in a solution having a metal salt dissolved in the at least one substance selected from the group, eluting at least one first component into the solution from the gel while removing by a trapping member the at least one first component eluted into the solution from the gel and/or any foreign substance which is produced or mixed in solution, said step of removing the at least one first component eluted into the solution being conducted so as to maintain constant a concentration of the at least one first component in the solution during said step of eluting so that the eluted first component does not impair a rate of elution of the at least one first component, and diffusing at least one second component into the gel from the solution while supplementing the at least one second component diffused into the gel from the solution to maintain constant a concentration of the at least one second component in the solution during said step of diffusing; and
   drying and sintering the gel having undergone said steps of immersing, eluting, and diffusing to thereby obtain a glass material.

5. A method of making a glass material according to any of claims 1, 2, 3, and 4, wherein a concentration gradient of a metal component is imparted to the gel by said step of immersing the gel in the solution.

6. A method of making a glass material according to claim 1, wherein the trapping member comprises a chelate resin material.

7. A method of making a glass material according to claim 1, wherein the trapping member comprises a porous material.

8. A method of making a glass material according to claim 1, wherein the trapping member comprises an electrically charged membrane.

9. A method of making a glass material according to claim 1, wherein the trapping member comprises a clathrate compound.

10. A method of making a glass material according to claim 1, wherein the trapping member comprises an organic polymer filter.

11. A method of making a glass material according to claim 3, wherein the solution contains the metal salt and said supplementing step comprises adding a sufficient amount of the metal salt to the solution to keep constant the concentration of the metal salt in the solution.

12. A method of making a glass material according to claim 4, wherein the solution contains the metal salt and said supplementing step comprises adding a sufficient amount of the metal salt to the solution to keep constant the concentration of the metal salt in the solution.

13. A method of making a glass material, said method comprising the steps of:

immersing a wet gel in a solution containing at least one substance selected from the group consisting of an organic solvent, water, an acid, and an alkali, or in a solution having a metal salt dissolved in the at least one substance selected from the group, and eluting at least one first component into the solution from the gel while removing by a trapping member the at least one first component eluted into the solution from the gel and/or any foreign substance which is produced or mixed in the solutions said step of removing the at least one first component eluted into the solution being conducted so as to maintain a concentration of the at least one first component constant in the solution during said step of eluting so that the eluted first component does not impair a rate of said eluting, and diffusing at least one second component into the gel from the solution while supplementing the at least one second component diffused into the gel from the solution to keep a concentration of the at least one second component constant in the solution during said step of diffusing; and drying and sintering the gel having undergone said steps of immersing, eluting, and diffusing to thereby obtain a glass material.

* * * * *